Dec. 23, 1924.                      1,520,335
W. DAVIS
PEDAL OPERATED DRIVING CONTROL OF MOTOR VEHICLES
Filed March 22, 1924    2 Sheets-Sheet 1
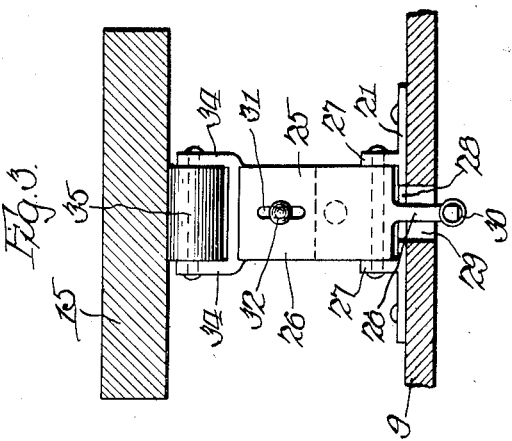
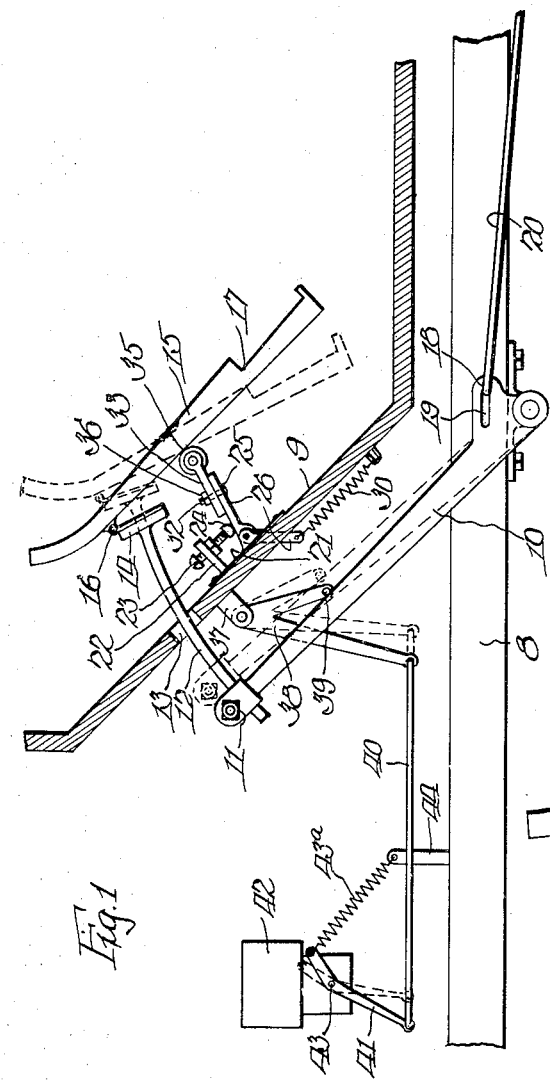
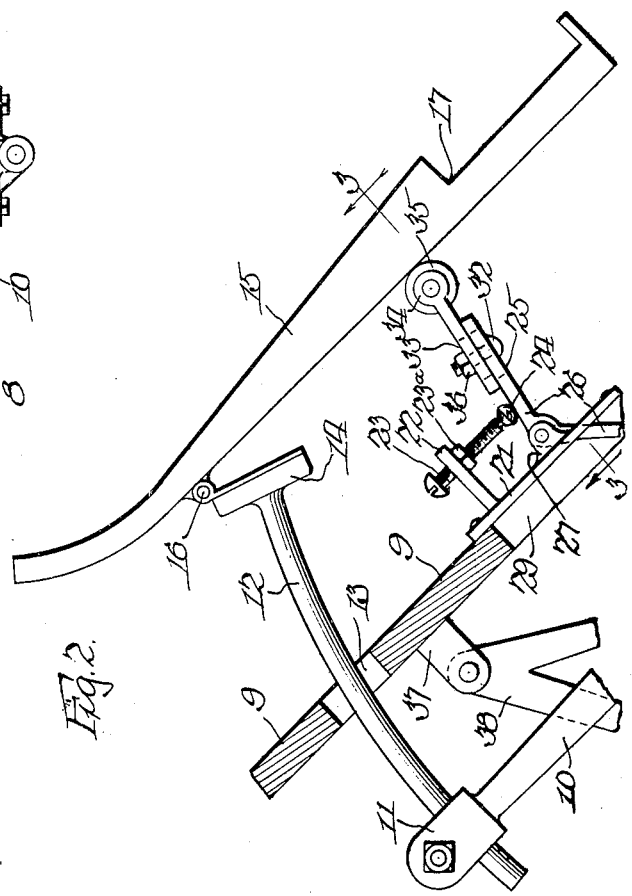
Inventor:
William Davis
By Chas. C. Tillman
Atty.

Dec. 23, 1924.
W. DAVIS
1,520,335
PEDAL OPERATED DRIVING CONTROL OF MOTOR VEHICLES
Filed March 22, 1924    2 Sheets-Sheet 2
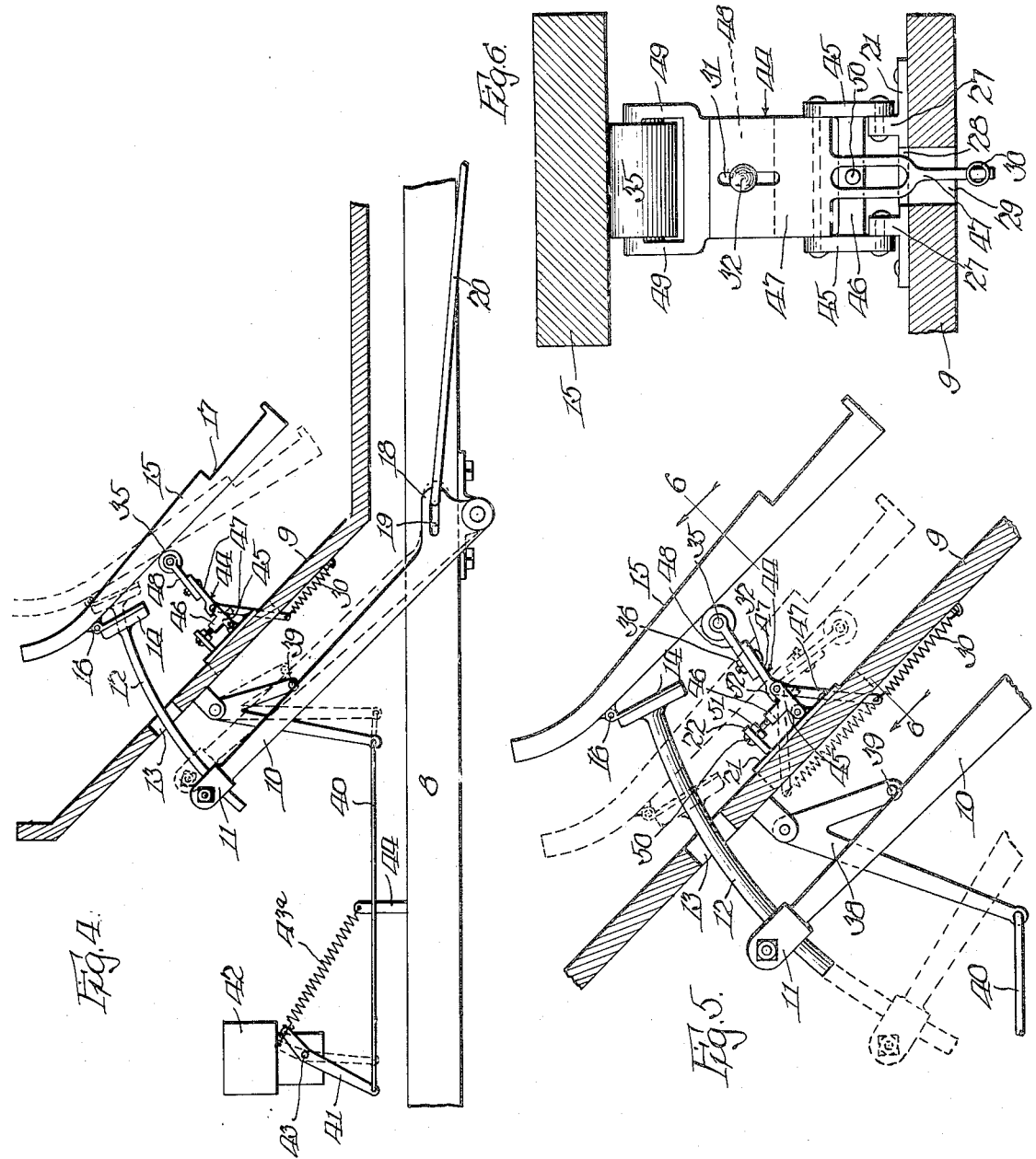
Inventor:
William Davis
By Chas C Gibleman
Atty.

Patented Dec. 23, 1924.

1,520,335

UNITED STATES PATENT OFFICE.

WILLIAM DAVIS, OF CHICAGO, ILLINOIS.

PEDAL-OPERATED DRIVING CONTROL OF MOTOR VEHICLES.

Application filed March 22, 1924. Serial No. 701,100.

*To all whom it may concern:*

Be it known, that I, WILLIAM DAVIS, a citizen of the United States, and resident of Chicago, in the county of Cook and State of Illinois, have invented certain new and useful Improvements in Pedal-Operated Driving Control of Motor Vehicles, of which the following is a specification.

This invention relates to the driving control of motor vehicles, and while particularly adapted to and intended for use in connection with the brakes and accelerators of automobiles in which they are so associated or arranged with respect to one another as to be operable by means of and with a single foot and pedal, is not limited thereto.

One of the objects of my present invention is to provide a brake, preferably of the standard type, in combination with means for operating an accelerator, which shall be of such construction and arrangement of its parts as to be readily installed or operatively applied to brake levers and accelerators of the ordinary or well known kind, without any material change or alteration in their positions on the automobile, or in their constructions, and further, without material alteration in the floor of an automobile body, yet you will afford efficient means whereby the accelerator may be operated without the operation of the brake or the brake without the operation of the accelerator.

Another object of the invention is the provision of a foot rest or pedal associated with the brake lever of a motor driven vehicle and with other parts of the apparatus in such a way that the entire weight of the foot of the operator will be supported by said rest or the pedal in a most comfortable and natural manner, and so that the brake will be easily and effectually operated, and when desired, the accelerator, by a proper movement of the foot.

Still another and important object, is the provision of means co-operating with the pedal for assisting in its support in such a way that its position can be adjusted relative to its hinged or pivoted point, and so that its movements, both pivotal and bodily, will be yieldingly resisted in a manner to equalize the pressure or weight of the foot on the pedal, yet to permit of slight oscillatory movement of the pedal.

Other objects and advantages of the invention will be disclosed in the following description and explanation, which will be more readily understood when read in conjunction with the accompanying drawings, in which embodiments of which the invention is susceptible are illustrated, it being understood that modifications and changes may be resorted to without a departure from the spirit of invention as expressed in the appended claims forming a part hereof.

In the drawings,—

Fig. 1 is a view partly in elevation and partly in section of a portion of the frame or chassis and body of an automobile illustrating one form of the invention mounted thereon and showing by continuous lines the parts in their normal positions and by dotted lines about the positions the parts will occupy when the accelerator is operated.

Fig. 2 is an enlarged view of parts of the device shown in Fig. 1.

Fig. 3 is an enlarged cross-sectional view taken on line 3—3 of Fig. 2 looking in the direction indicated by the arrows.

Fig. 4 is a view similar to Fig. 1 of like parts, but showing a modification in the construction of the adjustable and equalizing support for the pedal of the device.

Fig. 5 is an enlarged view of parts of the apparatus of the modified construction shown in Fig. 4 but illustrating by dotted lines about the positions the parts will occupy when the brakes are operated or set thereby, and Fig. 6 is an enlarged sectional view taken on line 6—6 of Fig. 5 looking in the direction indicated by the arrows.

Corresponding numerals of reference refer to like parts throughout the different views of the drawing.

Referring now more particularly to Figs. 1 to 3 inclusive, the reference numeral 8 designates a portion of the chassis or frame of an automobile and the numeral 9 a part of the frame of the body thereof, on which part a portion of the device for co-operation with the pedal thereof is mounted.

A lever 10 is fulcrumed at one of its ends on the frame 8 at a suitable position with respect to the upwardly inclined part 9 of the floor of the automobile and has at its front or opposite end a clamp 11 for engagement with a brake lever or rod 12 which is exended through a suitable opening 13 in the art 9 and has at its upper end an enlargement 14 or foot rest of the usual or any well known kind. To the front portion of the enlargement 14 the front part of the pedal 15 is hinged or pivotally secured as at 16 thoughout the different views of the drawing. The pedal 15 is located longitudinally with respect to the frame and body of the automobile and has a smooth lower surface, while its upper surface may be provided with a recess 17 in its rear or lower portion for the reception of the heel of the foot of the operator. The lever 10 is of the bell crank type and has in its shorter arm 18 a slot 19 in which is movably located one end of a rod 20 extended rearwardly therefrom and connected at its other end in a well known way to the equalizer of the brake mechanism, not shown.

By providing the shorter arm 18 of the lever 10 with the slot 19 and loosely connecting the rod 20 with said arm through its slot, it is manifest that some "play" or idle movement of the lever 10 in an upward direction will be afforded without having any effect through the rod 20 on the brake mechanism. This play or idle movement of the lever 10 is necessary when acceleration is desired, as will be presently explained.

Mounted on the upper surface of the floor part 9 is a plate 21 which has an upwardly extended upright or standard 22 near its front portion, which standard is provided with a transverse and screw-threaded opening for the reception and operation of a screw 23 having at one of its ends a knob or enlargement 24 and at its other end a head by means of which it can be adjusted in the standard 22 for the adjustment or limitation of the forward movement of the auxiliary or yielding support for the pedal 15, which support is designated as a whole by the numeral 25 and comprises a portion 26 of a bell crank type formation when viewed laterally or edgewise. This member 26 is pivotally mounted at its angle or rather at the juncture of the diverging parts thereof on a pair of spaced upwardly extended ears 27 on the upper surface of the plate 21 as is clearly shown in Figs. 2 and 3 of the drawings in the latter of which views it will be understood that the lower member 26 of the accelerator support 25 is extended through suitable slots 28 and 29 in the plate 21 and floor part 9 respectively.

The lower end of the lower member 26 has secured thereto one end of a spring 30, the other end of which is secured to a fixed part of the automobile such as the floor part 9 thereof at a suitable point rearwardly of the fulcrum of the support 25. The upper member 26 of this support is provided with a vertical slot 31 through which a screw bolt 32 is extended and engages a vertically adjustable member 33 which has journaled in the prongs 34 of its upper portion an anti-friction roller 35 for co-operation with the lower surface of the pedal 15.

A nut 36 engages the screw 32 so as to clamp the member 33 which carries the roller 35 to the upper part of the member 26 of the auxiliary support 25 or yielding member. By this arrangement it is manifest that by loosening the nut 36 on the screw 32, the member 33 can be raised or lowered with respect to the upper portion 26 of the member 25 when by tightening the nut 26 the member 33 will be held in the desired position to position the pedal 15 as desired with respect to the enlargement 14 on the upper end of the brake rod. Ordinarily, the adjusting screw 23 is so adjusted in the standard 22 and held in its adjusted position by a nut 23ª so that the knob or enlargement 24 on said screw will contact with the front portion of the auxiliary support 25 in such a way as to hold said support when in its normal position at a slight rearward inclination from a plane extended through the fulcrum of the support 25 at a right angle to the plate 21 or support on which the support 25 is mounted. By this arrangement it is manifest that the tension of the spring 30 will normally hold the support 25 against the knob or enlargement 24 of the adjusting screw 23, which latter will prevent or restrict forward movement of the auxiliary support, and that the roller 35 will be held in contact with the lower surface of the pedal.

Thus it will be understood that as the pedal is hinged or pivoted as at 16 to the enlargement 14 on the upper end of the brake lever 12 and rests on or is associated with the roller 35 in such a way that in the natural position of the foot of the operator on the pedal 15, the tension of the spring 30 and that of the springs of the brake mechanism will, respectively, hold the member 25 and brake rod or lever 12 in their normal positions and with a sufficient degree of tension to support the natural weight of the foot. Now, if it is desired to apply the brakes, all that is necessary is to press downwardly on the pedal, which action will cause a downward movement of the brake rod 12 and lever 10 as well as a rearward and downward movement as shown by dotted lines in Fig. 5 of the auxiliary or equalizing support 25 for the pedal. As soon as the pedal is relieved of a sufficient degree of pressure, the spring 30 and the springs of the brake mechanism will cause the parts to assume their normal positions as shown by continuous lines in the various figures of the drawings.

Secured to the lower surface of the floor part 9 preferably between the standard 22 and opening 13 in said part, is a depending bracket 37 to which the upper end of a bell crank lever 38 is fulcrumed. This lever 38 is located on one side of the brake lever 10 and its shorter arm is provided with a lateral extension or rod 39 extended over and across the lever 10 so as to be in the path of the upward movement of said lever from its normal position.

Pivotally connected at one of its ends to the longer arm 38 is a rod 40, the other end of which is pivotally connected to the throttle valve arm 41 of a carbureter 42 mounted at any suitable point and of the ordinary or any well known construction. The throttle valve arm 41 is pivoted as at 43 and has connected to its upper portion one end of a spring 43ª the other end of which is connected to a suitable fixed portion of the automobile. By this arrangement it is manifest that, assuming the parts are in their normal positions as shown by continuous lines in the different views of the drawings, and that acceleration is desired, all that is necessary to obtain the same is to apply slight pressure to the heel portion of the pedal 15, which action will cause the parts to assume about the positions shown by dotted lines in Fig. 1 of the drawings, it being understood that the pedal 15 will be oscillated on the roller 35 of the auxiliary and equalizing support 25, in which action the brake rod 12 and lever 10 will be moved upwardly, thus causing the latter to engage the rod or extension 39 on the lever 38 and actuate said lever to about the dotted line position shown in Fig. 1 when it will be understood acceleration will be attained.

In Figs. 4 to 6 inclusive I have shown a modification in the construction of the device which modification is restricted entirely to the construction of the auxiliary or equalizing support for the pedal, the other parts of the device being of the same construction, combination and operation as above set forth.

In the construction of the auxiliary, yielding, or equalizing support for the pedal shown in Figs. 1 to 3 inclusive, said support comprises two members only which are adjustably connected together. In the modification now under consideration, the auxiliary, yielding, or equalizing support is designated as a whole by the numeral 44 and consists of a pair of spaced and parallel members 45, see Fig. 6, united by a forwardly extending yoke 46, a member 47 of a bell crank type formation when viewed laterally or edgewise, and a member 48 having prongs 49 at its upper end and adjustably secured to the upper part of the member 47, by means of a screw 32, slot 31, and nut 36 of similar construction and arrangement as that shown and explained in the first above described construction. The member 48 is provided as in the other construction with an anti-friction roller 35 for co-operation with the lower surface of the pedal 15.

The bell crank shaped member 47 is pivotally mounted at its angular or bent portion on and between the upper portions of the parallel members 45, and the lower portions of said members are pivotally mounted on the spaced ears 27 of the base plate 21 for the auxiliary support. As is clearly shown in Fig. 6, the lower portion of the member 47 is extended through the slots 28 and 29 in the plate 21 and floor part 9 respectively, and has connected thereto below said floor part one end of the spring 30, the other end of which is secured to a fixed part of the automobile. In this modified construction an adjusting screw 50 is loosely mounted on the standard 22 and engages the yoke 46 about midway between the members 45 which it unites. A nut 51 is mounted on the screw 50 to fix the same after adjustment of the members 45 through the instrumentality of the yoke 46 and said screw is affected.

By the foregoing arrangement of the parts of the auxiliary support 44, it is manifest that the inclination of the members 45 can be regulated by turning the adjusting screw 50 in the proper direction and locking said screw by means of the nut 51 after the proper adjustment has been made. At the juncture of the upper and lower portions of the member 47, the same is provided with a downwardly extended stop 52 to engage the front upper portions of the members 45, for the purpose of restricting the movement of the support 44 in a forward direction. In this modified form of the auxiliary support the same is ordinarily adjusted to a position whereby the axis of the roller 35 will be positioned a slight distance rearwardly of a plane drawn at right angles to the plate 21 through the fulcrum of the part 47 of the auxiliary support, thus enabling the roller 35 to provide an equalizing effect on the pedal 15 yet in such a way as to permit the pedal to be pressed downwardly to about the position shown by dotted lines in Fig. 5 when it is desired to apply the brakes.

Having thus fully described my invention, what I claim as new and desire to secure by Letters Patent is:

1. In a device of a class described, the combination with a pair of members to be actuated, one of said members being depressible and the other of said members arranged for and actuable by the movement of the depressible member in one direction, of a pedal pivotally connected to said depressible member, means adjacent said depressible member for yieldingly and tiltably supporting said pedal thereon whereby the pedal may be tilted and said depressible member moved in the direction to actuate said other member.

2. In a device of the class described, the combination with a pair of members to be actuated, one of said members being depressible and the other of said members arranged for and actuable by the movement of the depressible member in one direction, of a pedal pivotally connected to said depressible member, means adjacent said depressible member for yieldingly and tiltably supporting said pedal thereon whereby the pedal may be tilted and said depressible member moved in the direction to actute said other member, and means for restricting the movement of said yielding means in one direction.

3. In a device of the class described, the combination with the brake lever and accelerator of a motor vehicle, of a pedal pivotally connected near one of its ends to the brake lever, a spring-actuated auxiliary support co-acting with the pedal rearwardly of its connection with the brake lever for yieldingly and tiltably supporting the pedal, a movable member operatively connected to said accelerator and having a part extended in the path of travel in one direction of the brake lever whereby the accelerator may be operated by the tilting movement in one direction of the pedal on the said auxiliary support.

4. A device of the class described including in combination with a depressible member to be actuated, a pedal pivotally connected near one of its ends thereto, spring actuated and vertically adjustable means adjacent said member for co-operation with the pedal rearwardly of its pivotal point for yieldingly and tiltably supporting the latter, and adjustable means for restricting the movement of said yielding means in one direction.

5. The combination with a pair of spaced members to be actuated, of a pedal pivotally connected to one of said members, means adjacent said member for yieldingly and tiltably supporting said pedal, said other member to be actuated having a part adapted for contact with and actuation by the said member to which the pedal is connected when the latter is tilted.

WILLIAM DAVIS.